United States Patent [19]
Wolfschwenger et al.

[11] Patent Number: 6,060,561
[45] Date of Patent: May 9, 2000

[54] USE OF THERMOPLASTIC ELASTOMERS FOR IMPROVING THE STABILITY OF POLYOLEFINS TO IONIZING RADIATION

[75] Inventors: Johannes Wolfschwenger, Niederneukirchen; Klaus Bernreitner, Linz, both of Austria

[73] Assignee: Borealis AG, Austria

[21] Appl. No.: 09/021,302

[22] Filed: Feb. 10, 1998

[30] Foreign Application Priority Data

Feb. 11, 1997 [AT] Austria ....................................... 211/97

[51] Int. Cl.[7] ...................................................... C08K 5/07
[52] U.S. Cl. ........................................... 525/159; 524/474
[58] Field of Search ............................... 525/159; 524/474

[56] References Cited

U.S. PATENT DOCUMENTS 4,274,932  6/1981  Williams et al. .................... 204/159.2

FOREIGN PATENT DOCUMENTS 0 683 206  11/1995  European Pat. Off. .
0 695 781  2/1996   European Pat. Off. .
WO95/00566  1/1995  WIPO .

*Primary Examiner*—Terressa M. Boykin
*Attorney, Agent, or Firm*—Wenderoth, Lind & Ponack, L.L.P.

[57] ABSTRACT

Use of thermoplastic elastomers for improving the stability of polyolefins to ionizing radiation, and also a process for improving the stability of polyolefins, in which thermoplastic elastomers are admixed with the polyolefins.

15 Claims, No Drawings

USE OF THERMOPLASTIC ELASTOMERS FOR IMPROVING THE STABILITY OF POLYOLEFINS TO IONIZING RADIATION

The present invention relates to the use of thermoplastic elastomers as additional components or modifiers added to polyolefins for improving stability to ionizing radiation.

Because of their good combination of cost and technological properties, polyolefins have found applications in a very wide variety of sectors in past decades. However, this has also led to constantly increasing requirements of the material and as a result to constant improvements to, and extension of, its property profile. This also made it possible for, for example, polypropylenes to be used in the medical/pharmaceutical sector, where their high melting point, which allows sterilization at 121° C. with superheated steam without any difficulty, is a favorable factor. However, the poor suitability of polypropylenes for sterilization by means of ionizing radiation, for example by means of β- or γ-rays, X-rays, etc. has an unfavorable influence, especially since these methods are becoming increasingly important and widespread.

With polyolefins, irradiation normally causes a number of unfavorable effects: degradation of molar mass (rise in melt flow index, MFI), discoloration or yellowing and embrittlement. The reason for this is mainly that the radiation gives rise to free-radical reactions in the polymer, and these cannot be effectively checked by conventional stabilizer systems. An overview of the stabilization of polyolefins is given, for example, in "Kunststoffadditive [Plastics Additives]", 3rd edition, Hanser-Verlag. In the past, therefore, various attempts have been undertaken to suppress these unfavorable effects by providing polyolefins with specific additives. For example, according to U.S. Pat. No. 4,274,932, "mobilizing agents", such as hydrocarbons, halogenated hydrocarbons, phthalates, polymeric fats, vegetable oils or silicone oils, and according to highly amorphous polypropylenes, were therefore added to the polyolefins. A decisive disadvantage of some of these additives is in particular that as foreign substances they alter the properties of the polyolefins in an unpredictable manner, they cause additional complexity and cost and, especially when used in the medical/pharmaceutical or food sectors, they give rise to a problem of hygiene, especially as a result of migration.

The object of the present invention was therefore to reduce or eliminate these disadvantages and especially to provide other polyolefin formulations with improved stability to ionizing radiation without having to use excessive amounts of foreign substances. This objective was achieved by adding thermoplastic elastomers to the polyolefins conventionally used.

The invention therefore provides the use of thermoplastic elastomers selected from the class consisting of olefinic block copolymers, isoprene polymers, isoprene copolymers, styrene polymers, styrene copolymers and polyurethanes as additional component (modifier) added to polyolefins (base polymer) for improving stability to ionizing radiation.

The thermoplastic elastomers used according to the invention are described, for example, in "Thermoplastic Elastomers, A Comprehensive Review", Carl Hanser-Verlag, Munich, 1987, in EP 683206 A1, EP 695781 A and WO 95/00566. They are built up essentially from hard and soft blocks or segments, which are composed of both crystalline and amorphous phases.

Preference is given to the use of isoprene (co)polymers, styrene (co)polymers and also of olefinic (co)polymers and olefinic block (co)polymers, since these are more compatible with propylene polymers than are thermoplastic polyurethanes (TPU).

Particular preference is given to the use of olefinic (co)polymers and/or olefinic block (co)polymers, since these, because of their formulation, are particularly compatible with propylene polymers. In addition, because of the absence of styrene units, for example, recyclability is markedly improved.

The particularly preferred thermoplastic elastomers are, for example, ethylene-ethylene/propylene block copolymers, composed, for example, of crystalline polyethylene blocks and amorphous ethylene/propylene block copolymer blocks.

Other particularly preferred thermoplastic elastomers are block copolymers made from (a) polyethylene blocks with a melting point of from 90 to 120° C. and (b) ethylene-α-olefin copolymer blocks. Such products are produced and marketed by, for example, Kuraray, Japan (XE 103).

The thermoplastic elastomers (modifiers) are used according to the invention to make polyolefins resistant to degradation induced by ionizing rays, in particular γ-rays. Preferred examples of such polyolefins are polymers of mono- or diolefins selected from the class consisting of polyethylenes, polypropylenes, polybutenes, polyisobutenes, polycycloolefins, such as cyclopentene or norbornene, and also copolymers of these with α-olefins, and moreover polyethylenes such as LDPE, LLDPE, HDPE and ultrahigh-molecular-weight HDPE. Other preferred base polymers are highly isotactic polypropylenes and copolymers of propylene with one or more α-olefins and with a proportion of propylene of at least 50 mol %, with an isotactic index of greater than 90 and a melt flow index (MFI 230/2.16) of from 0.1 to 100 g/10 min. Particular preference is given to highly isotactic polypropylenes or copolymers of propylene with one or more α-olefins and with a proportion of propylene of at least 70 mol %, with an isotactic index of greater than 95 and also a melt flow index of from 0.5 to 50 g/10 min. The isotactic index was measured using $^{13}$C NMR, as described, for example, in Macromolecules 6 (6) 925–26 (1973) and EP-B-255.693. Copolymers of propylene preferably used are random copolymers or heterophasic copolymers (block copolymers) with one or more comonomers selected from the class consisting of $C_2$ olefins and $C_4$–$C_{10}$ olefins, for example ethylene, butene, hexene or decene, particularly preferably with ethylene.

The thermoplastic elastomers are present in the compound stabilized according to the invention in an amount of from 1 to 60% by weight, preferably from 1 to 25% by weight, particularly preferably from 2 to 10% by weight, based on the total amount of polymer.

The preparation (polymerization) of the polyolefins cited as examples may be free-radical or catalytic, for example with the aid of Ziegler-Natta, Phillips or metallocene catalysts, using known methods.

Other examples of the polyolefins mentioned are mixtures of the polymers mentioned, such as mixtures of polypropylene with polyisobutylene, polypropylene with polyethylene and mixtures of the different polyethylene grades. Other polyolefins are copolymers and/or terpolymers of mono- and diolefins with one another or with other vinyl monomers, for example ethylene-propylene copolymers, linear low-density polyethylenes (LLDPE) and mixtures of the abovementioned polyolefins. The polyolefins (compounds) stabilized according to the invention with better stability to ionizing radiation may contain, besides the thermoplastic elastomers, various other conventional additives, such as antioxidants, UV stabilizers, lubricants, antiblocking agents, antistats, colorants, chemical degraders and/or fillers and reinforcing materials.

A significant difference of such compounds when compared with conventional heterophasic propylene/ethylene copolymers (e.g. Daplen FSC 1012 from PCD Polymere) is that conventional heterophasic copolymers are composed of a crystalline polypropylene homopolymer matrix, which contains the amorphous ethylene-propylene copolymer (EPR). Such products, however, are not stable to ionizing radiation.

The invention also provides a process for improving the stability of polyolefins to ionizing radiation, which comprises admixing with the polyolefins (base polymer), as additional component (modifier), a thermoplastic elastomer selected from the class consisting of olefinic block copolymers, isoprene polymers, isoprene copolymers, styrene polymers, styrene copolymers and polyurethanes. This is preferably done by mixing base polymer and modifier in a kneader or mixer of conventional construction at temperatures from 190 to 300° C., preferably from 200 to 250° C., with addition of conventional additives, stabilizers and possibly of nucleating agents and, if desired, organic peroxides to adjust processability by controlled degradation.

Examples of stabilizers used are primary (phenolic) and secondary (phosphitic) antioxidants, UV absorbers and "HALS" type UV stabilizers (sterically hindered amines), and, as examples of nucleating agents, talc, Na benzoate, sorbitol derivatives and organic phosphates.

The polymer mixtures stabilized according to the invention may be further processed in a known manner to give desired semifinished or finished products, for example to give granules, profiles, sheets, films, injection moldings and extrusions with improved stability to ionizing radiation.

EXAMPLES

The base polymer used was a PP homopolymer powder having an MFI of 0.5 g/10 min, corresponding to Daplen BE 50 from PCD Polymere.

The modifier used was an ethylene-ethylene/propylene block copolymer having a melt flow index of 2 g/10 min and a melting point of the crystalline phase of 101° C. with an amorphous and a crystalline phase (XE 103, Kuraray, Japan).

The following stabilizers and additives were used: Irganox 1010, Ciba Geigy pentaerythritol tetrakis[3-(3,5-di-tert-butyl-4-hydroxyphenyl)propionate] as primary (phenolic) antioxidant Irgafos 168, Ciba Geigy tris(2,4-di-tert-butylphenyl) phosphite as secondary (phosphitic) antioxidant Hostanox 03, Hoechst AG bis[3,3-bis(4'-hydroxy-3'-tert-butylphenyl)butanoic] glycol ester as primary (phenolic) antioxidant Ultranox 626, General Electric Co. bis(2,4-di-tert-butylphenyl) pentaerythritol diphosphite as secondary (phosphitic) antioxidant oleamide (Unichema) as lubricant.

The processibility of the systems was determined via the melt flow index (MFI) according to ISO 1133/DIN 53735 at 230° C. and a load of 2.16 kg. The mechanical behavior of the systems (mixtures and reference materials) was determined on injection-molded test specimens (according to DIN 16774 (1988) at a melt temperature of 250° C. and mold temperature of 30° C.), using the tensile test at +23° C. on an injection-molded 35 dumbbell F3/3 according to DIN 53455 (1981) for the tensile strength. In each case, a zero value was determined on unirradiated test specimens as a base value for the stability studies.

In addition, for some mixtures, notched impact strength at +23° C. (ISO 179 1 eA, notch radius 0.25 mm) was tested on standard bar B, before and after the irradiation. To study stability to ionizing radiation, the test specimens were exposed to γ-radiation at a dose of 5 Mrad and subsequently stored. The storage was at +50° C., in order to give the process greater acceleration than at room temperature. To be specific, although the degradation process is initiated by the radiation, it takes a relatively long time for adverse effects subsequently to become clearly recognizable. Removal from storage (at +50° C.) and subsequent testing (at +23° C.) took place after 3, 30, 60, 90, 120, 180 and 240 days (i.e. over a period of 8 months).

Examples 1 to 6 and Comparative Examples C1 to C4

The mixtures (compounds) were each prepared by mixing the powder and/or granules in the appropriate weight ratio and with addition of appropriate amounts of stabilizers and an organic peroxide (bis(1,1-dimethylethyl) peroxyisopropyl)benzene=Perkadox 14 Sfl, AKZO NOBEL), as shown in Table 1. The data in Table 1 are percentages by weight, based on the entire mixture, the balance of 100% of the mixture corresponding to the amount of the base polymer. The mixture was then melted at 200–240° C. in a COLLIN twin-screw extruder with 25 mm screw diameter and extruded at an output rate of 4 kg/h via two annular dies to give extrudates, each of 3 mm. The residence time in the extruder was about 20 s. The extrudate was granulated after solidification in a water bath. The MFI of the resultant granules is like-wise cited in Table 1.

The mechanical properties of the mixtures are given in Table 2. The relative values, based on the zero test, are cited under "rel". It is apparent that adding thermoplastic elastomers to a propylene homopolymer, even without further additions of known "stabilizers" gives a markedly improved property spectrum, compared with the comparative examples, in counteracting the damaging action of ionizing radiation. After irradiation with 5.0 Mrad and storage for several months at 50° C., the tensile strength is still at the original level. The efficacy of the added thermoplastic elastomers is further illustrated by the results of the tensile strength test and the notched impact strength test. Here, the mixtures modified with thermoplastic elastomers are significantly better than a propylene homopolymer (based on Daplen PT 551) or a conventional heterophasic propylene-ethylene copolymer (based on Daplen FSC 1012).

TABLE 1

Formulation of the mixtures (% by weight)

| Ex. | Irg. 1010 | Host. 03 | Irg. 168 | U.626 | OA | 2425 K | XE-103 | Base polymer | MFI (230/2.16) [g/10 min] |
|---|---|---|---|---|---|---|---|---|---|
| C1 | 0.05 | | 0.05 | | | | | PP-Homo*) | 20 |
| C2 | | 0.05 | | 0.05 | 0.35 | | | PP-Homo | 20 |
| C3 | | 0.05 | | 0.05 | | 4 | | PP-Homo | 20 |
| C4 | | 0.05 | | 0.05 | | | | HECO**) | 5 |
| 1,2 | | 0.05 | | 0.05 | | | 4 | PP-Homo | 20 |
| 3 | | 0.05 | | 0.05 | | | 1 | PP-Homo | 20 |
| 4 | | 0.05 | | 0.05 | | | 2 | PP-Homo | 20 |
| 5 | | 0.05 | | 0.05 | | | 8 | PP-Homo | 20 |
| 6 | | 0.05 | | 0.05 | | | 16 | PP-Homo | 20 |

*)Propylene homopolymer (corresponding to Daplen PT 551)
**)Heterophasic propylene-ethylene copolymer (corresponding to Daplen FSC 1012)
Irg. 1010  Irganox 1010
Host. 03   Hostanox 03
Irg. 168   Irgafos 168
U.626      Ultranox 626
OA         oleamide
2425 K     Polyethylene, Daplen LDPE 2425 K from PCD Polymere
XE-103     Thermoplastic elastomer from Kuraray

TABLE 2

Mechanical properties

| Ex. | 0 | 0 rel | 3 | 3 rel | 30 | 30 rel | 60 | 60 rel | 90 | 90 rel | 120 | 120 rel | 180 | 180 rel | 240 | 240 rel |
|---|---|---|---|---|---|---|---|---|---|---|---|---|---|---|---|---|

Tensile strength [Mpa] after x days at 50° C.

| Ex. | 0 | 0 rel | 3 | 3 rel | 30 | 30 rel | 60 | 60 rel | 90 | 90 rel | 120 | 120 rel | 180 | 180 rel | 240 | 240 rel |
|---|---|---|---|---|---|---|---|---|---|---|---|---|---|---|---|---|
| C1 | 34.2 | 1.00 | 35.6 | 1.04 | 32.5 | 0.95 | 26.1 | 0.76 | 23.8 | 0.70 | 22.4 | 0.65 | | | | |
| C2 | 34.1 | 1.00 | 35.4 | 1.04 | 25.1 | 0.74 | 24.4 | 0.72 | 22.8 | 0.67 | 22.7 | 0.67 | | | | |
| C3 | 31.2 | 1.00 | 33.2 | 1.06 | 26.1 | 0.84 | 30.6 | 0.98 | 28.0 | 0.90 | 27.3 | 0.88 | 26.1 | 0.84 | 26.4 | 0.85 |
| 1 | 30.4 | 1.00 | 32.4 | 1.07 | 33.4 | 1.10 | 31.9 | 1.05 | 33.3 | 1.10 | 33.1 | 1.09 | 33.8 | 1.11 | 32.4 | 1.07 |
| 3 | 31.4 | 1.00 | 32.3 | 1.03 | | | 33.9 | 1.08 | | | 32.9 | 1.05 | | | | |
| 4 | 31.2 | 1.00 | 31.5 | 1.01 | | | 33.2 | 1.06 | | | 32.4 | 1.04 | | | | |
| 5 | 28.1 | 1.00 | 27.3 | 0.97 | | | 28.8 | 1.02 | | | 28.0 | 1.00 | | | | |
| 6 | 23.4 | 1.00 | 23.5 | 1.00 | | | 24.6 | 1.05 | | | 24.0 | 1.03 | | | | |

Notched impact strength [kJ/m$^2$] after x days at 50° C.

| Ex. | 0 | 0 rel | 3 | 3 rel | 30 | 30 rel | 60 | 60 rel | 90 | 90 rel | 120 | 120 rel | 180 | 180 rel | 240 | 240 rel |
|---|---|---|---|---|---|---|---|---|---|---|---|---|---|---|---|---|
| C4 | 7.8 | 1.00 | 6.3 | 0.81 | 4.0 | 0.51 | 3.6 | 0.46 | 3.5 | 0.45 | 2.2 | 0.28 | 2.3 | 0.29 | 1.6 | 0.21 |
| 2 | 4.1 | 1.00 | 3.2 | 0.78 | 3.2 | 0.78 | 3.9 | 0.95 | 3.6 | 0.88 | 3.1 | 0.76 | 3.2 | 0.78 | 3.2 | 0.78 |

What is claimed is:

1. A method for improving the stability of a polyolefin base polymer to ionizing radiation, which comprises admixing said polyolefin base polymer with a thermoplastic elastomer selected from the group consisting of olefinic block copolymers, isoprene polymers, isoprene copolymers, styrene polymers, styrene copolymers and polyurethane.

2. The method as claimed in claim 1, wherein the thermoplastic elastomer is an olefinic block copolymer.

3. The method as claimed in claim 2, wherein the block copolymer is composed of
   a) polyethylene blocks having a melting point of from 90 to 120° C. and
   b) ethylene-α-olefin copolymer blocks.

4. The method as claimed in claim 1, wherein the polyolefin base polymer is a polymer of mono- or diolefins selected from the group consisting of polyethylenes, polypropylenes, polybutenes, polyisobutenes, polycycloolefins and also copolymers of these with α-olefins.

5. The method as claimed in claim 1, wherein the polyolefin base polymer is highly isotactic polypropylene or copolymer of propylene with one or more α-olefins and with a proportion of propylene of at least 50 mol %, with an isotactic index of greater than 90 and a melt flow index of from 0.1 to 100 g/10 min.

6. The method as claimed in claim 1, wherein the polyolefin base polymer is highly isotactic polypropylene or copolymer of propylene with one or more α-olefins and with a proportion of propylene of at least 70 mol % and has an isotactic index of greater than 95 and a melt flow index of from 0.5 to 50 g/10 min.

7. The method as claimed in claim 6, wherein the copolymer of propylene is a random copolymer or a heterophasic copolymer with one or more comonomers selected from the class consisting of $C_2$ olefins and $C_4$–$C_{10}$ olefins.

8. The method as claimed in claim 7, wherein ethylene is used as comonomer.

9. The method as claimed in claim 1, wherein the thermoplastic elastomer is used in an amount of from 1 to 60% by weight, to based on the total amount of polymer.

10. The method as claimed in claim 1, which consists essentially of admixing with said polyolefin base polymer with said thermoplastic elastomer.

11. The method as claimed in claim 9, wherein said thermoplastic elastomer is used in an amount of from 1 to 25% by weight.

12. The method as claimed in claim 9, wherein said thermoplastic elastomer is used in an amount of from 2 to 10% by weight.

13. The method of claim 1, wherein the mixture of base polymer and thermoplastic elastomer is subjected to irradiation.

14. The method of claim 13, which consists essentially of said admixing and irradiation.

15. The method of claim 14, which consists of said admixing and irradiation.

* * * * *